US010307661B2

United States Patent
Dandamudi et al.

(10) Patent No.: US 10,307,661 B2
(45) Date of Patent: Jun. 4, 2019

(54) GAME BOARD

(71) Applicant: NXP B.V., Eindhoven (NL)

(72) Inventors: Srikanth Dandamudi, Bangalore (IN); Harish Dixit, Bangalore (IN); Swapnil Shekhar Borgaonkar, Bangalore (IN); Sreedhar Patange, Bangalore (IN)

(73) Assignee: NXP B.V., Eindhoven (NL)

( * ) Notice: Subject to any disclaimer, the term of this patent is extended or adjusted under 35 U.S.C. 154(b) by 11 days.

(21) Appl. No.: 15/135,509

(22) Filed: Apr. 21, 2016

(65) Prior Publication Data
US 2016/0310832 A1    Oct. 27, 2016

(30) Foreign Application Priority Data

Apr. 22, 2015   (EP) .................................. 15164706

(51) Int. Cl.
   *A63F 3/00*     (2006.01)
   *A63F 13/00*    (2014.01)
   (Continued)

(52) U.S. Cl.
   CPC .......... *A63F 3/00643* (2013.01); *A63F 13/00* (2013.01); *A63F 13/214* (2014.09);
   (Continued)

(58) Field of Classification Search
   CPC ...... A63F 2009/2442; A63F 2009/2486; A63F 2003/00662; A63F 13/214; A63F 13/235; A63F 2003/00646; A63F 3/00643
   (Continued)

(56) References Cited

U.S. PATENT DOCUMENTS 6,190,174 B1 * 2/2001 Lam ...................... A63H 33/42
                                                          273/237
8,737,515 B2 * 5/2014 Ruland .................... A63F 5/00
                                                          375/130
(Continued)

FOREIGN PATENT DOCUMENTS

EP        2397197 A1    12/2011
EP        2752227 A1     7/2014

OTHER PUBLICATIONS

Ruland, C. "Localization System for Roulette and other Table Games", University of Siegen, Hoelderlinstrasse, DE, retrieved from the internet at: http://www.casinojournal.com/ext/resources/White-Papers/Localization-System-for-Roulette-and-Other-Table-Games-Casino-Journal.pdf (Jan. 10, 2014).
(Continued)

*Primary Examiner* — Michael A Cuff

(57) ABSTRACT

According to a first aspect of the present disclosure there is provided a game board being arranged to accommodate at least one game piece, said game board comprising at least one NFC device and a plurality of NFC antennas which are operatively coupled to said NFC device, wherein said NFC device is arranged to activate a function of said game piece by establishing NFC with the game piece through one of said antennas. According to a second aspect of the present disclosure a corresponding method for activating at least one game piece on a game board is provided. According to a third aspect of the present disclosure there a corresponding computer program product is provided.

20 Claims, 2 Drawing Sheets

(51) Int. Cl.
*A63F 13/245* (2014.01)
*A63F 13/235* (2014.01)
*A63F 13/214* (2014.01)
*A63F 9/24* (2006.01)

(52) U.S. Cl.
CPC .......... *A63F 13/235* (2014.09); *A63F 13/245* (2014.09); *A63F 2003/00646* (2013.01); *A63F 2003/00665* (2013.01); *A63F 2009/246* (2013.01); *A63F 2009/2486* (2013.01)

(58) Field of Classification Search
USPC .............................................. 273/237; 463/39
See application file for complete search history.

(56) References Cited

U.S. PATENT DOCUMENTS

| | | | | |
|---|---|---|---|---|
| 9,227,135 | B2* | 1/2016 | Hong | A63F 13/005 |
| 9,623,319 | B2* | 4/2017 | Miller | A63F 7/0023 |
| 9,703,489 | B2* | 7/2017 | Yokota | G06F 3/0605 |
| 9,747,307 | B2* | 8/2017 | Kier | G06F 17/30259 |
| 2010/0004062 | A1 | 1/2010 | Maharbiz et al. | |
| 2012/0077593 | A1* | 3/2012 | Sarmenta | A63F 3/00643 463/40 |
| 2013/0217496 | A1* | 8/2013 | Olkin | A63F 3/00075 463/32 |
| 2014/0094312 | A1* | 4/2014 | Wouhaybi | A63F 3/00643 463/42 |
| 2014/0113552 | A1* | 4/2014 | Siddiqui | H04B 5/0056 455/41.1 |
| 2014/0295731 | A1 | 10/2014 | Weston | |
| 2015/0321089 | A1* | 11/2015 | Akavia | A63F 13/235 463/39 |
| 2015/0339021 | A1* | 11/2015 | Duteil | A63F 13/06 345/156 |
| 2015/0375114 | A1* | 12/2015 | Scott | A63F 13/40 463/47 |
| 2015/0375115 | A1* | 12/2015 | Bunting | A63F 13/47 463/29 |

OTHER PUBLICATIONS

Extended European Search Report for Patent Appn. No. 15164706.2 (Sep. 4, 2015).

* cited by examiner

GAME BOARD

CROSS-REFERENCE TO RELATED APPLICATIONS

This application claims the priority under 35 U.S.C. § 119 of European patent application no. 15164706.2, filed on Apr. 22, 2015, the contents of which are incorporated by reference herein.

FIELD

The present disclosure relates to a game board. Furthermore, the present disclosure relates to a corresponding method for activating at least one game piece on a game board, and to a corresponding computer program product.

BACKGROUND

Today, there are many different board games, such as chess games, puzzles, constructions game (e.g. LEGO®) and theme-based games. There may be a need to increase the attractiveness of such board games.

SUMMARY

According to a first aspect of the present disclosure there is provided a game board being arranged to accommodate at least one game piece, said game board comprising at least one NFC device and a plurality of NFC antennas which are operatively coupled to said NFC device, wherein said NFC device is arranged to activate a function of said game piece by establishing NFC with the game piece through one of said antennas.

In one or more embodiments, the NFC device is further arranged to supply power to an NFC tag comprised in said game piece, such that the game piece may use said power to perform said function.

In one or more embodiments, the NFC device is further arranged to write function control data into said NFC tag, such that the game piece may perform said function in dependence on said function control data.

In one or more embodiments, the game board further comprises a microcontroller operatively coupled to said NFC device, wherein the NFC device is further arranged to determine a location of the game piece on the game board by identifying the position of the antenna in the antenna array and to provide said location to the microcontroller, and said microcontroller is arranged to select the function control data from a predefined set of function control data in dependence on the location of the game piece.

In one or more embodiments, the game board further comprises a user interface unit which is operatively coupled to the microcontroller and which is arranged to receive, from an external user interface device, data to he used as said function control data.

In one or more embodiments, the microcontroller is further arranged to remember the location of the game piece.

In one or more embodiments, the microcontroller is further arranged to select the function control data in dependence on a detected proximity of another game piece on the game board.

In one or more embodiments, the microcontroller and the NFC device are integrated in the same package.

In one or more embodiments, the antennas are arranged in an antenna array.

In one or more embodiments, a game system comprises a game board of the kind set forth and at least one game piece.

In one or more embodiments, the game piece comprises a further NFC device, said further NFC device being one of the group of: an NFC tag, an NFC device operating in a peer-to-peer mode, and an NFC device having reader functionality.

In one or more embodiments, the further NFC device is an NFC tag, and the function of the game piece is preprogrammed in said NFC tag and/or the game piece is arranged to receive power from said NFC device through said NFC tag.

In one or more embodiments, the game system is included in a chess game, a puzzle, a construction game, or a theme-based game.

According to a second aspect of the present disclosure there is provided a method for activating at least one game piece on a game board, said game board comprising at least one NFC device and a plurality of NFC antennas which are operatively coupled to said NFC device, wherein said NFC device activates a function of said game piece by establishing NFC with the game piece through one of said antennas.

According to a third aspect of the present disclosure there is provided a computer program product comprising computer-executable instructions which, when being executed by a processing unit, cause said processing unit to carry out or control a method of the kind set forth.

DESCRIPTION OF DRAWINGS

Embodiments will be described in more detail with reference to the appended drawings, in which.

DESCRIPTION OF EMBODIMENTS

In accordance with the present disclosure, there is provided a game board being arranged to accommodate at least one game piece, said game board comprising at least one NFC device and a plurality of NFC antennas which are operatively coupled to said NFC device, wherein said NFC device is arranged to activate a function of said game piece by establishing NFC with the game piece through one of said antennas.

Board games are often quite static and non-interactive in nature, which may among others be caused by the fact that animated objects or game pieces in board games often require additional power supply, which may be impractical to implement. Some board games may have game pieces that are controlled remotely, but this often requires additional wiring, which may also be impractical to implement and which may not be desired from an aesthetic point of view. By activating a function of a game piece by means of NFC, a more dynamic game experience may be provided, since the game piece may be triggered by the establishment of an NFC channel to perform a certain function (e.g. moving, producing a sound, producing a light effect). For example, when the game piece is brought into proximity of a particular antenna in the game board, the NFC device may establish an NFC channel with a further NFC device, for example an NFC tag, which is comprised in said game board. Subsequently, the NFC tag may cause a functional component of the game piece (e.g. a motor, a speaker, a light source) to produce a certain predefined effect.

Figure 1:
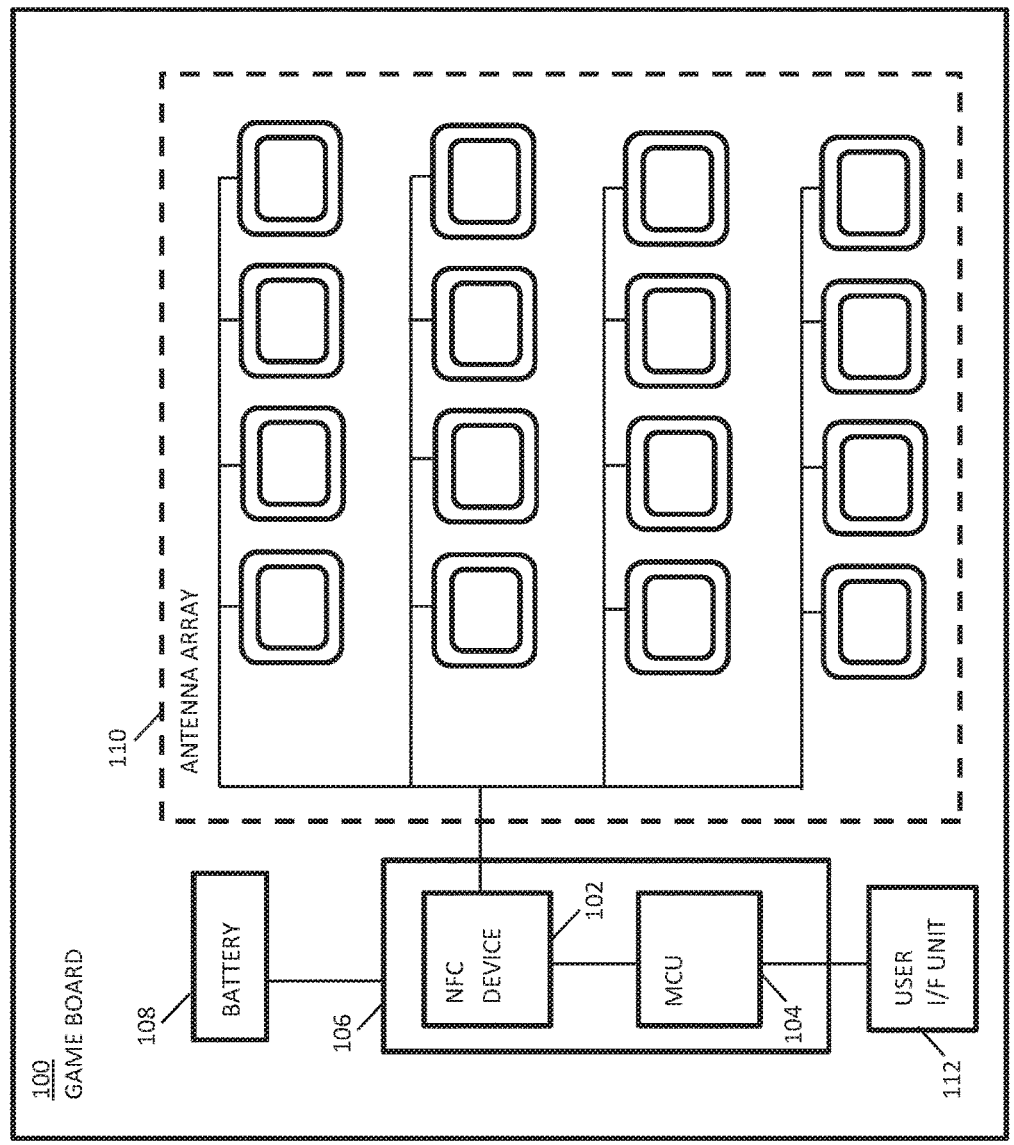
FIG. 1 shows an illustrative embodiment of a game board.

FIG. 1 shows an illustrative embodiment of a game board 100. The game board 100 comprises an NFC device 102 which is operatively coupled to a microcontroller 104. The NFC device 102 and the microcontroller 104 are integrated in a single package 106. Furthermore, the NFC device 102 is operatively coupled to NFC antennas in an antenna array 110. The NFC device 102 may be coupled to the NFC antennas through multiplexers (not shown). Furthermore, the NFC device 102 and the microcontroller 104 are coupled to a battery 108 which provides them with operating power. Furthermore, the microcontroller 104 is operatively coupled to a user interface unit 112, which may enable an external user interface device (not shown) to provide data to the microcontroller 104. For example, the user interface unit 112 may also be an NFC interface unit. In that case, a user may provide data to the microcontroller 104 using an NFC-enabled mobile device, for instance. Alternatively, the user interface unit 112 may be Wi-Fi, a Bluetooth or a USB interface unit.

Figure 2:
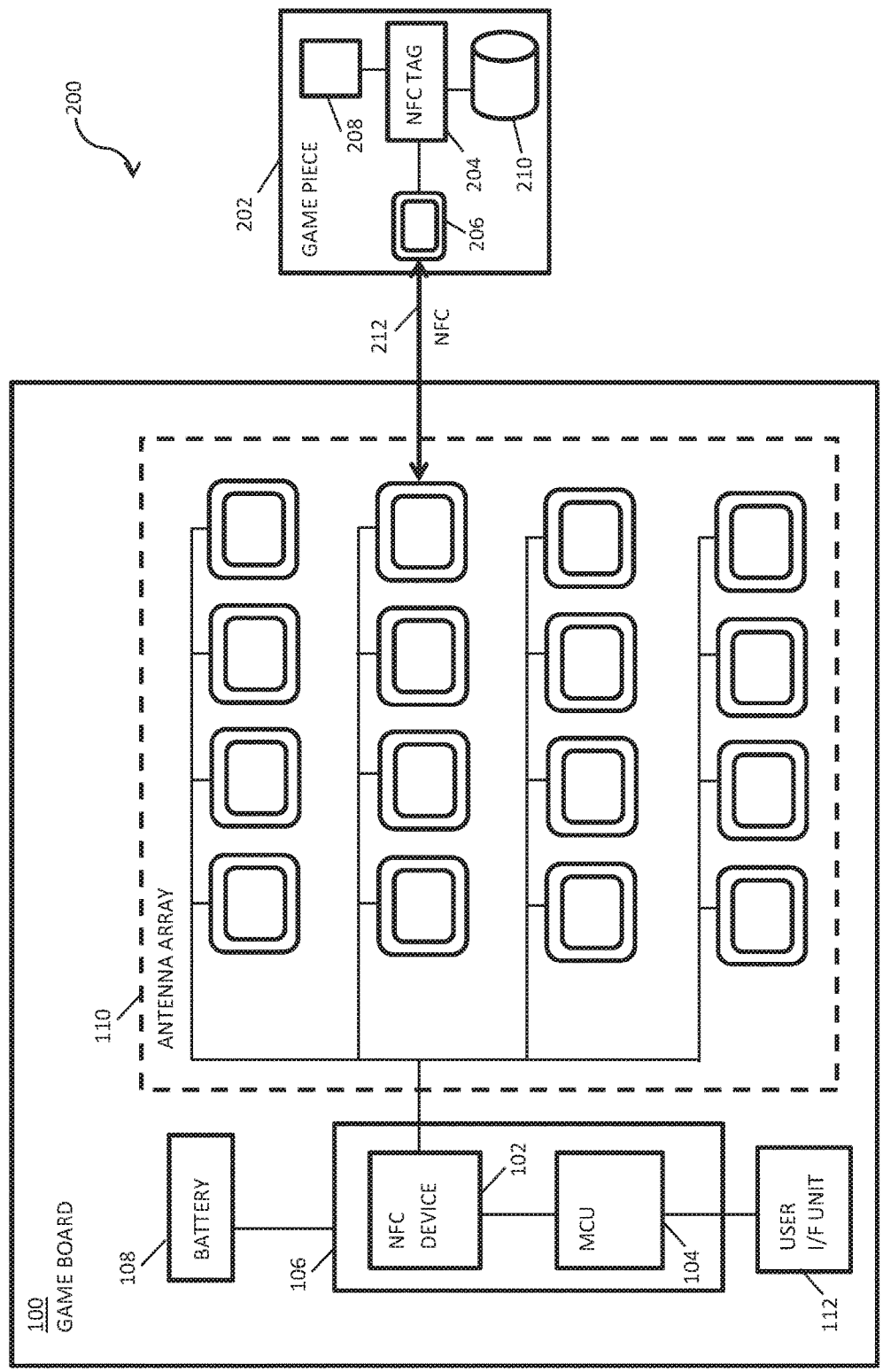
FIG. 2 shows an illustrative embodiment of a game system.

FIG. 2 shows an illustrative embodiment of a game system 200. In addition to the game board 100, the game system 200 comprises at least one game piece 202. The game piece 202 comprises an NFC tag 204 which is operatively coupled to an NFC antenna 206. The NFC tag 204 may, for example, comprise an NFC tag IC which is commonly available on the market, such as the NTAG203 NFC tag IC produced by NXP Semiconductors. It is noted that the NFC tag 204 is merely an example of an NFC device which may be embedded into the game piece 202. Alternatively, but without limitation, the NFC device may be an NFC device operating in a peer-to-peer mode or an NFC device having reader functionality.

Furthermore, the game piece 202 comprises a functional component 208 which is operatively coupled to the NFC tag 204. The functional component 208 may be a speaker or a light source, for example. Furthermore, the game piece comprises a motor 210 which is operatively coupled to the NFC tag 204. The motor 210 may enable the game piece to perform certain predefined movements, for example. In operation, NFC 212 may be established between the NFC antenna 206 and one of the NFC antennas of the game board 100 when they are brought into proximity of each other. In response to said NFC 212 having been established, the NFC tag 204 may initiate a movement of the game piece by controlling the motor 210, for example, or it may cause the functional component 208 to produce a certain effect.

In one or more embodiments, the NFC device 102 is further arranged to supply power to the NFC tag 204 comprised in the game piece 202, such that the game piece 202 may use said power to perform a function. Thus, the game piece 202 does not need to be equipped with a power source, which may enable a more elegant design of the game piece 202, for example. Furthermore, in case the game piece 202 should be small, it may be unfeasible to equip it with a power source: in that case the game piece 202 may still perform a function requiring power because it can draw power from the field generated by the NFC device 102. The NFC device 102 may be an NFC reader/writer as commonly available on the market, including a transceiver IC, for instance the CLRC663 transceiver IC produced by NXP Semiconductors. In one or more embodiments, the microcontroller 104 and the NFC device 102 are integrated in the same package 106; thereby, the production cost may be reduced.

Furthermore, the NFC device 102 may be arranged to write function control data into said NFC tag 204. Then, the game piece 202 may perform said function in dependence on said function control data. Thus, the functionality of the game piece 202 may be controlled remotely, while the game piece 202. does not need to he equipped with a dedicated control interface, for example. It may be envisaged, for instance, that the motor 210 may enable different movements of the game piece 202. In that case, the NFC device 102 may write function control data that prescribe a specific one of said movements into the NFC tag 204. Then, the NFC tag 204 may control the motor 210 using said function control data. For example, the function control data may prescribe a timed rotational movement. Furthermore, it may be envisaged that, in case the functional component 208 is a light source, the function control data prescribe switching on the light source for a certain amount of time.

As mentioned above, the game board 100 may comprise a microcontroller 104 which is operatively coupled to the NFC device 102. In that case, the NFC device 102 may be further arranged to determine a location of the game piece 202 on the game board 100 by identifying the position of the antenna in the antenna array 110. That is to say, the NFC device 102 may be coupled to the antennas in the antenna array 110 through a multiplexer structure, and the NFC device 102 may determine which one of the antennas has engaged in NFC with the NFC antenna 206 of the game piece 202. Since this particular antenna has a given position in the array 110, the location of the game piece 202 on the game board 100 may easily be derived. Then, the NYC device 102 may pass on said location to the microcontroller 104, and the microcontroller 104 may select function control data in dependence on the location of the game piece 202 on the board 100. The function control data may be selected from a predefined set of function control data. It may be envisaged, for instance, that when the game piece 202 is at a certain spot on the board 100, that a light effect should be produced, while when the game piece 202 is at another spot on the board 100, the game piece 202 should make a particular movement. Thus, a more dynamic user experience may be realized.

Furthermore, the game board 100 may comprise a user interface unit 112 which is operatively coupled to the microcontroller 104. In operation, the user interface unit 112 may receive, from an external user interface device, data to be used as said function control data. Thereby, the functionality of game pieces may easily be reconfigured. It may be envisaged, for instance, that a user has an NFC-enabled mobile device which enables him to provide data specifying certain movements and sound/light effects to the microcontroller 104, and that the microcontroller 104 subsequently uses those data as function control data in the above-described sense. A computer program (e.g. a downloadable "app") for entering and/or modifying said data may be installed on said mobile device. It is noted that the term "game board" may refer to any structure that may accommodate game pieces. In other words, the game board 100 does not necessarily need to be a classic game board, but it may also be a structure containing a touch screen or it may itself be a touch screen. In that case, the antenna array 110 may be buried beneath the touch screen or embedded into the touch screen.

In one or more embodiments, the microcontroller 104 is further arranged to remember the location of the game piece 202 on the game board 100. This may be useful, for instance, when a chess game is interrupted and the chess pieces have accidentally been moved. Then, when the game is resumed, the microcontroller 104 may be queried for the remembered (correct) locations of the chess pieces through the user interface unit 112.

Furthermore, the microcontroller 104 may select the function control data in dependence on a detected proximity of another game piece on the game board 100. For instance, when several game pieces are placed on the board 100, a first game piece (e.g. a lion) may produce a certain sound effect (e.g. a roar) when another game piece (e.g. another animal) approaches it. This may be implemented as follows. The NFC device 102 may determine the locations of both game pieces on the board 100 and provide them to the microcontroller 104 in the above-described manner. Subsequently, the microcontroller 104 may detect the proximity of the other game piece by comparing the determined locations. If it detects said proximity, the microcontroller 104 may select function control data (e.g. an instruction to produce a roar) from a predefined set of function control data. Subsequently, the microcontroller 104 may cause the NFC device 102 to write the selected function control data to the NFC tag of the first game piece (e.g. the lion). Subsequently, the NFC tag of the first game piece (e.g. the lion) may cause an embedded functional component (e.g. a speaker) to produce the sound effect (e.g. the roar). Again, this may enable a more dynamic user experience.

The systems and methods described herein may be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must he made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 game board
102 NFC device
104 microcontroller
106 IC package
108 battery
110 antenna array
112 user interface unit
200 game system
202 game piece
204 NFC tag
206 antenna 208 functional component
210 motor
212 NFC

The invention claimed is:

1. A game board apparatus being arranged to accommodate a game piece which is used to play a board game by being moved on the game board, said game board comprising:
a game board with a plurality of locations for positioning said game piece;
a near-field communication (NFC) device; and
a plurality of NFC antennas which are operatively coupled to said NFC device, wherein during play of the board game, said NFC device is arranged to activate an electrical circuit in said game piece to cause said game piece to produce a predefined movement associated with play of the board game by establishing NFC with the game piece through one of said NFC antennas.

2. A game board apparatus as claimed in claim 1, wherein the NFC device is further arranged to supply power to an NFC tag comprised in said game piece, such that the game piece may use said power to produce said predefined movement, and wherein the NFC device is further arranged to activate an electrical circuit in said game piece to cause said game piece to produce at least one of an audio or visual effect.

3. The game board as claimed in claim 2, wherein the NFC device is arranged to cause the game piece to produce the motion, sound, and/or light for a predefined amount of time.

4. A game board apparatus as claimed in claim 1, wherein the NFC device is further arranged to write function control data into an NFC tag comprised in said game piece, such that the game piece may produce said effect in dependence on said function control data, wherein in response to said function control data and associated with play of the board game, the game piece produces a predefined movement and produces a sound, or switches on a light source within the game piece.

5. A game board as claimed in claim 1, wherein the antennas are arranged in an antenna array physically integrated as part of the game board.

6. A game system comprising a game board as claimed in claim 1 and at least one game piece.

7. A game system as claimed in claim 6, wherein the game piece comprises another NFC device, said other NFC device being one of the group of: an NFC tag, an NFC device operating in a peer-to-peer mode, and an NFC device having reader functionality.

8. A game system as claimed in claim 7, wherein the other NFC device is an NFC tag, and wherein the effect of the game piece is preprogrammed in said NFC tag and/or wherein the game piece is arranged to receive power from said NFC device through said NFC tag.

9. A game system as claimed in claim 6, which is included in a chess game, a puzzle, a construction game, or a theme-based game.

10. The game board apparatus as claimed in claim 1, wherein the game piece includes a speaker, and the NFC device is arranged to activate the speaker of the game piece to produce a predefined effect by establishing NFC with the game piece through one of the antennas.

11. The game board apparatus as claimed in claim 1, wherein the game piece includes a motor, and the NFC device is arranged to activate a timed rotation of the game piece by establishing NFC with the game piece through one of the antennas.

12. The game board apparatus as claimed in claim 1, wherein the game piece includes a light source, and the NFC device is arranged to produce a specified light effect by establishing NFC with the game piece through one of the antennas.

13. A game board being arranged to accommodate a game piece, said game board comprising:
an NFC device and a plurality of NFC antennas which are operatively coupled to said NFC device, wherein said NFC device is arranged to activate an electrical circuit in said game piece to cause said game piece to produce a predefined motion associated with play of the board game by establishing NFC with the game piece through one of said antennas, to supply power to an NFC tag comprised in said game piece, such that the game piece may use said power to produce said predefined motion, and to write function control data into said NFC tag, such that the game piece may produce said predefined motion in dependence on said function control data; and
a microcontroller operatively coupled to said NFC device, wherein the NFC device is further arranged to determine a location of the game piece on the game board by identifying a position of the antenna and to provide said location to the microcontroller, and wherein said microcontroller is arranged to select the function control data from a predefined set of function control data in dependence on the location of the game piece.

14. A game board as claimed in claim 13, further comprising a user interface unit which is operatively coupled to the microcontroller and which is arranged to receive, from an external user interface device, data to be used as said function control data.

15. A game board as claimed in claim 13, wherein the microcontroller is further arranged to remember the location of the game piece.

16. A game board as claimed in claim 13, wherein the microcontroller is further arranged to:
determine a location of another game piece on the game board;
detect a proximity of the other game piece relative to the game piece; and
select the function control data for the game piece in dependence on the detected proximity of the other game piece on the game board.

17. A game board as claimed in claim 13, wherein the microcontroller and the NFC device are integrated in the game board.

18. A method for activating at least one game piece on a game board, said game board comprising at least one NFC device and a plurality of NFC antennas which are operatively coupled to said NFC device, wherein said NFC device activates an electrical circuit in the at least one game piece to cause the at least one game piece to produce a predefined motion associated with play of the game board by establishing NFC with the game piece through one of said antennas.

19. A computer program product comprising computer-executable instructions which, when being executed by a processing unit, cause said processing unit to carry out or control a method as claimed in claim 18.

20. The method of claim 18, including selecting at least one of a light effect, a sound effect, and a particular movement from a list of predefined effects for the game piece, based on a determined location of the game piece on the game board.

* * * * *